(12) United States Patent
Hoshino et al.

(10) Patent No.: US 10,001,960 B2
(45) Date of Patent: Jun. 19, 2018

(54) DISPLAY PANEL, DISPLAY DEVICE, AND ILLUMINATION DEVICE

(71) Applicant: Sony Corporation, Tokyo (JP)

(72) Inventors: Norifumi Hoshino, Kanagawa (JP); Toshiya Takagishi, Kanagawa (JP); Hiromasa Mori, Tokyo (JP); Teppei Imamura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days. days.

(21) Appl. No.: 15/124,377

(22) PCT Filed: Feb. 9, 2015

(86) PCT No.: PCT/JP2015/053487
§ 371 (c)(1),
(2) Date: Sep. 8, 2016

(87) PCT Pub. No.: WO2015/146319
PCT Pub. Date: Oct. 1, 2015

(65) Prior Publication Data
US 2017/0017453 A1 Jan. 19, 2017

(30) Foreign Application Priority Data
Mar. 24, 2014 (JP) ................. 2014-060024

(51) Int. Cl.
*G06F 3/14* (2006.01)
*G02B 5/02* (2006.01)
(Continued)

(52) U.S. Cl.
CPC ............. *G06F 3/1446* (2013.01); *G02B 1/14* (2015.01); *G02B 5/0278* (2013.01); *G09G 3/32* (2013.01);
(Continued)

(58) Field of Classification Search
None
See application file for complete search history.

(56) References Cited

U.S. PATENT DOCUMENTS

| 5,914,698 A | 6/1999 | Nicholson et al. |
| 6,175,342 B1 | 1/2001 | Nicholson et al. |

(Continued)

FOREIGN PATENT DOCUMENTS

| JP | 2000-505213 A | 4/2000 |
| JP | 2003-043954 A | 2/2003 |

(Continued)

OTHER PUBLICATIONS

Written Opinion and English translation thereof dated Apr. 21, 2015 in connection with International Application No. PCT/JP2015/053487.

(Continued)

*Primary Examiner* — Kenneth B Lee, Jr.
(74) *Attorney, Agent, or Firm* — Wolf, Greenfield & Sacks, P.C.

(57) ABSTRACT

Improved image quality is achieved with a display device. A display panel includes a panel substrate and a film. In the display panel, multiple light emitting elements are provided on the panel substrate. In the display panel, the film is a film made of a material having a predetermined refractive index, and a thickness depending on a viewing angle and the refractive index, the viewing angle being an angle of a field of view where a substrate end distance from a light emitting element that is closest to an end of the panel substrate among the light emitting elements to the end and brightness of the light satisfy predetermined criteria.

14 Claims, 10 Drawing Sheets

(51) Int. Cl.
　　　*G02B 1/14*　　　　(2015.01)
　　　*G09G 3/32*　　　　(2016.01)
(52) U.S. Cl.
　　　CPC . *G09G 2300/026* (2013.01); *G09G 2320/028* (2013.01); *G09G 2320/0233* (2013.01)

(56)　　　　References Cited

U.S. PATENT DOCUMENTS

| | | |
|---|---|---|
| 6,414,650 B1 | 7/2002 | Nicholson et al. |
| 2001/0037591 A1 | 11/2001 | Nicholson et al. |
| 2002/0175881 A1 | 11/2002 | Luoma et al. |
| 2005/0162342 A1 | 7/2005 | Luoma et al. |
| 2007/0251132 A1 | 11/2007 | Luoma et al. |
| 2011/0050657 A1 | 3/2011 | Yamada |

FOREIGN PATENT DOCUMENTS

| | | | |
|---|---|---|---|
| JP | 2006-145682 A | 6/2006 |
| JP | 2010-113139 A | 5/2010 |
| JP | 2011-047977 A | 3/2011 |
| JP | 2013-088529 A | 5/2013 |

OTHER PUBLICATIONS

International Preliminary Report on Patentability and English translation thereof dated Oct. 6, 2016 in connection with International Application No. PCT/JP2015/053487.

DISPLAY PANEL, DISPLAY DEVICE, AND ILLUMINATION DEVICE

TECHNICAL FIELD

The present technology relates to a display panel, a display device, and an illumination device. More specifically, the present technology relates to a display panel covered with a protective film, a display device, and an illumination device.

BACKGROUND ART

In display devices, a tiling display in which multiple display panels are arranged has been used in some cases for the purpose of increasing the screen size. For example, a tiling display in which multiple display panels are arranged at regular intervals in a two-dimensional grid on a rectangular base has been proposed (refer, for example, to Patent Document 1). In such a tiling display, each of the display panels may be covered with a transparent film to protect circuits and elements on the display panel from moisture and dust.

CITATION LIST

Patent Document

Patent Document 1: Japanese Patent Application Laid-Open No. 2011-47977

SUMMARY OF THE INVENTION

Problems to be Solved by the Invention

With the display panel described above, however, if the film is relatively thick, light is output not only through the surface of the film but also through side faces of the film. Thus, when a viewer views the display panel at an angle smaller than a certain angle, light rays through the side faces may reach the viewer's eyes in addition to light rays through the surface, and the ends of the display panel may appear brighter than the remaining part thereof. Such a difference in brightness disadvantageously causes brightness unevenness, and lowers image quality within a viewing angle.

The present technology has been made in view of such circumstances, and an object thereof is to improve image quality in a display device.

Solutions to Problems

The present technology has been achieved to overcome the aforementioned disadvantages, and a first aspect thereof is directed to a display panel including: a panel substrate provided with multiple light emitting elements configured to emit light; and a film made of a material having a predetermined refractive index, and a thickness depending on a viewing angle and the refractive index, the viewing angle being an angle of a field of view where a substrate end distance from a light emitting element that is closest to an end of the panel substrate among the light emitting elements to the end and brightness of the light satisfy predetermined criteria. This produces an effect that a film having a thickness dependent on a substrate end distance, the viewing angle, and the refractive index is provided.

In the first aspect, the thickness may be set to a constant value that is thinner as the substrate end distance is shorter. This produces an effect that a thinner film is provided as the substrate end distance is shorter.

Furthermore, in the first aspect, the thickness may be set to a constant value that is thinner as the refractive index is greater. This produces an effect that a thinner film is provided as the refractive index is greater.

Furthermore, in the first aspect, the thickness may be set to a constant value that is thinner as the viewing angle is greater. This produces an effect that a thinner film is provided as the viewing angle is greater.

Furthermore, in the first aspect, the thickness may be a value determined by the following expression: $t_{f1} \leq Y_1 \cdot [-\mathrm{Sin}\{(\pi-k)/2\}]^{1/2}/[-\mathrm{nf}+\mathrm{Sin}\{(\pi-k)/2\}]^{1/2}$ where the thickness is represented by $t_{f1}$, the substrate end distance is represented by $Y_1$, the refractive index is represented by $N_f$, the viewing angle is represented by V, and a coefficient expressed by $V \cdot \pi/180$ is represented by k. This produces an effect that a film having a thickness determined according to the following expression is provided: $t_{f1} \leq Y_1 \cdot [-\mathrm{Sin}\{(\pi-k)/2\}]^{1/2}/[-\mathrm{nf}+\mathrm{Sin}\{(\pi-k)/2\}]^{1/2}$.

In the first aspect, a side face light blocking part that blocks light at a side face of the film; and a surface light blocking part that blocks light at a surface of the film in a range from a specific position, which is between the light emitting element and the end, to the end may further be included. This produces an effect that light is blocked at the side faces of the film, and light is blocked at the surface of the film in the range from the specific position to the end.

Furthermore, in the first aspect, the thickness may be set to a constant value that is thinner as a wraparound amount that is a distance from the specific position to the end is greater. This produces an effect that a thinner film is provided as the wraparound amount is greater.

Furthermore, in the first aspect, the thickness may be a value determined by the following expression: $t_{f2} \leq (Y_1-Y_2) \cdot \{\mathrm{nf}-\mathrm{Sin}(k/2)\}^{1/2}/\mathrm{Sin}(k/2)$ where the thickness is represented by $t_{f2}$, the substrate end distance is represented by $Y_1$, the refractive index is represented by $N_f$, the viewing angle is represented by V, a coefficient expressed by $V \cdot \pi/180$ is represented by k, and the wraparound amount is represented by $Y_2$. This produces an effect that a film having a thickness determined according to the following expression is provided: $t_{f2}=(Y_1-Y_2) \cdot \{\mathrm{nf}-\mathrm{Sin}(k/2)\}^{1/2}/\mathrm{Sin}(k/2)$.

Furthermore, in the first aspect, the thickness may be a value determined by the following expression: $t_{f2} \leq \{Y_1-Y_2+t_p \mathrm{Tan}(k/2)\} \cdot \{n_f-\mathrm{Sin}(k/2)\}^{1/2}/\mathrm{Sin}(k/2)$ where the thickness is represented by $t_{f2}$, the substrate end distance is represented by $Y_1$, the refractive index is represented by $N_f$, the viewing angle is represented by V, a coefficient expressed by $V \cdot \pi/180$ is represented by k, the wraparound amount is represented by $Y_2$, and a height of the surface light blocking part is represented by $t_p$. This produces an effect that a film having a thickness determined according to the following expression is provided:

$$t_{f2}=\{Y_1-Y_2+t_p \mathrm{Tan}(k/2)\} \cdot \{n_f-\mathrm{Sin}(k/2)\}^{1/2}/\mathrm{Sin}(k/2).$$

Furthermore, in the first aspect, a side face light blocking part that blocks light at a side face of the film; and a rounded surface light blocking part that blocks light at a rounded surface formed on the film by edge rounding in a range from a specific position, which is between the light emitting element and the end, to the end may further be included. This produces an effect that light is blocked at the side faces of the film and light is blocked at the rounded surface.

Furthermore, in the first aspect, the thickness may be set to a constant value that is thinner as a rounding distance that is a distance from the specific position to the end is greater. This produces an effect that a thinner film is provided as the rounding distance is greater.

Furthermore, in the first aspect, the thickness may be a value determined by the following expression: $t_f \leq (Y_1 - Y_2') \cdot \{n_f - \mathrm{Sin}(k/2)\}^{1/2}/\mathrm{Sin}(k/2)$ where the thickness is represented by $t_f$, the substrate end distance is represented by $Y_1$, the refractive index is represented by $N_f$, the viewing angle is represented by V, a coefficient expressed by $V \cdot \pi/180$ is represented by k, and the rounding distance is represented by $Y_2'$. This produces an effect that a film having a thickness determined according to the following expression is provided: $t_f = (Y_1 - Y_2') \cdot \{n_f - \mathrm{Sin}(k/2)\}^{1/2}/\mathrm{Sin}(k/2)$.

Furthermore, in the first aspect, the thickness may be a value determined by the following expression: $t_f \leq \{Y_1 - Y_2' + t_p' \mathrm{Tan}(k/2)\} \cdot \{n_f - \mathrm{Sin}(k/2)\}^{1/2}/\mathrm{Sin}(k/2)$ where the thickness is represented by $t_f$, the substrate end distance is represented by $Y_1$, the refractive index is represented by $N_f$, the viewing angle is represented by V, a coefficient expressed by $V \cdot \pi/180$ is represented by k, the rounding distance is represented by $Y_2'$, and a height of one end of the rounded surface light blocking part with respect to a surface of the film is represented by $t_p'$. This produces an effect that a film having a thickness determined according to the following expression is provided:

$$t_f = \{Y_1 - Y_2' + t_p' \mathrm{Tan}(k/2)\} \times \{n_f - \mathrm{Sin}(k/2)\}^{1/2}/\mathrm{Sin}(k/2).$$

Furthermore, a second aspect of the present technology is directed to a display device including: multiple display panels, each of the display panels including a panel substrate provided with multiple light emitting elements configured to emit light, and a film made of a material having a predetermined refractive index, and a thickness depending on a viewing angle and the refractive index, the viewing angle being an angle of a field of view where a substrate end distance from a light emitting element that is closest to an end of the panel substrate among the light emitting elements to the end and brightness of the light satisfy predetermined criteria; and a control unit configured to control the display panels. This produces an effect that a film having a thickness dependent on a substrate end distance, the viewing angle, and the refractive index is provided.

Furthermore, the second aspect of the present technology is directed to an illumination device including: multiple illumination panels, each of the illumination panels including a panel substrate provided with multiple light emitting elements configured to emit light, and a film made of a material having a predetermined refractive index, and a thickness depending on a viewing angle and the refractive index, the viewing angle being an angle of a field of view where a substrate end distance from a light emitting element that is closest to an end of the panel substrate among the light emitting elements to the end and brightness of the light satisfy predetermined criteria; and a control unit configured to control the illumination panels. This produces an effect that a film having a thickness dependent on a substrate end distance, the viewing angle, and the refractive index is provided.

Effects of the Invention

According to the present technology, in the display device, an excellent advantageous effect that image quality can be improved can be achieved. Note that the effects are not necessarily limited to those mentioned herein, but may include any of effects disclosed herein.

MODE FOR CARRYING OUT THE INVENTION

Modes for carrying out the present technology (hereinafter referred to as embodiments) will be described below. The description will be made in the following order.

1. First embodiment (example of setting film thickness based on substrate end distance, viewing angle, and refractive index)

2. Second embodiment (example of providing light blocking part and setting film thickness based on substrate end distance, viewing angle, and refractive index)

3. Third embodiment (example of rounding edges and setting film thickness based on substrate end distance, viewing angle, and refractive index)

4. Modified examples

1. First Embodiment

[Example Structure of Display Device]

Figure 1:
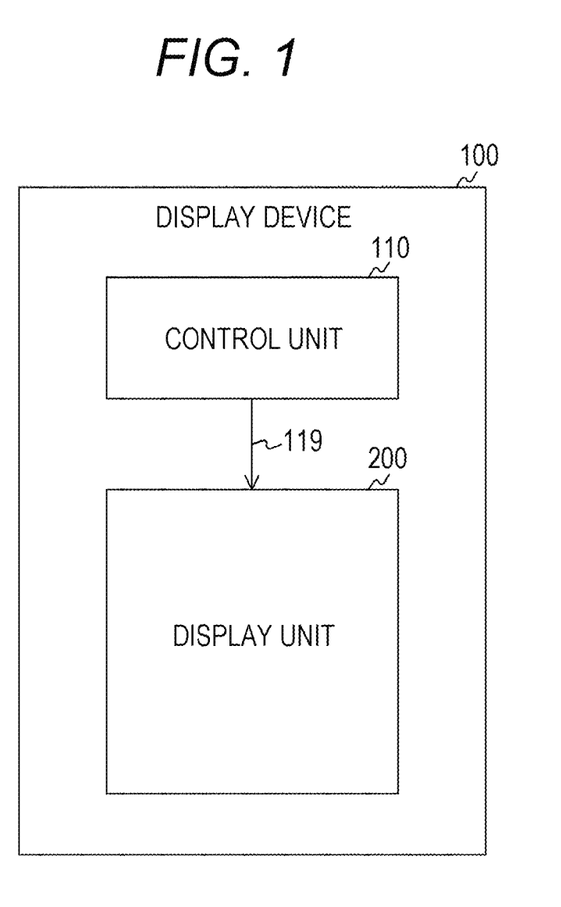
FIG. 1 is a block diagram illustrating an example structure of a display device according to a first embodiment.

FIG. 1 is a block diagram illustrating an example structure of a display device 100 according to an embodiment. The display device 100 is a device for displaying moving images and static images, and includes a control unit 110 and a display unit 200.

The control unit 110 controls the entire display device 100. The control unit 110 generates control signals such as timing signals and pixel signals, and power supply signals, and supplies the signals to the display unit 200 via a signal line 119. Note that the timing signals include horizontal synchronizing signals and vertical synchronizing signals. The pixel signals include signals indicating gradations of each of R (red), G (green), and B (blue), for example. The display unit 200 displays moving images and the like according to the control of the control unit 110.

[Example Structure of Display Unit]

Figure 2:
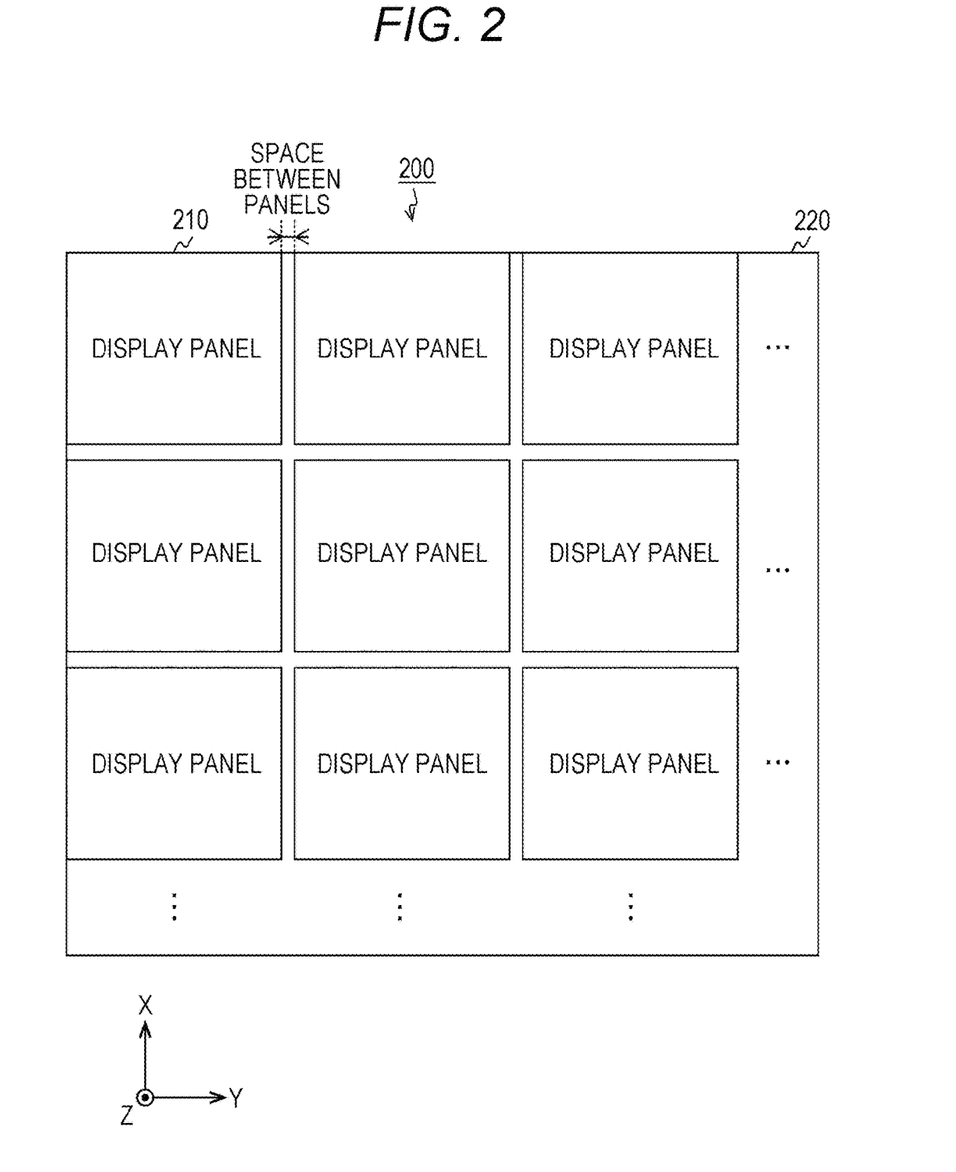
FIG. 2 is an example of a top view of a display unit according to the first embodiment.

FIG. 2 is an example of a top view of the display unit 200 according to the first embodiment. The display unit 200 includes multiple display panels 210 and a base substrate 220. The base substrate 220 is a rectangular substrate larger than the display panels 210. A display panel 210 is a rectangular panel that displays a part of an image. These display panels 210 are arranged in a two-dimensional grid on the base substrate 220. The respective display panels 210 and the base substrate 220 are bonded with an adhesive or the like. A predetermined space is provided between two adjacent display panels 210 so as to place a spacer or leave a space to which the adhesive escapes.

Figure 3:
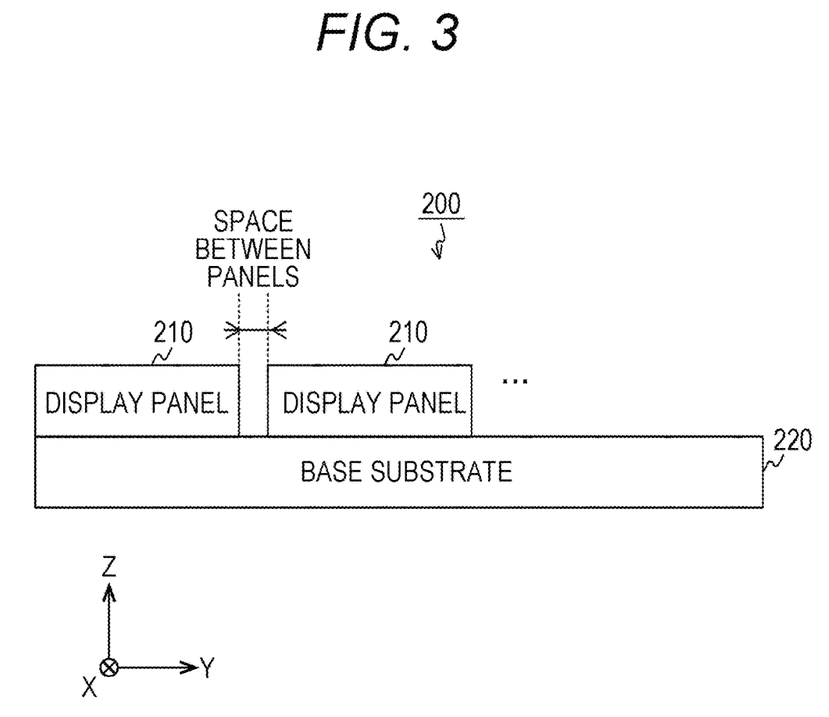
FIG. 3 is an example of a cross-sectional view of the display unit according to the first embodiment.

FIG. 3 is an example of across-sectional view of the display unit 200 according to the first embodiment. As illustrated in FIG. 3, multiple display panels 210 are arranged with predetermined spaces therebetween on the base substrate 220.

[Example Structure of Display Panel]

Figure 4:
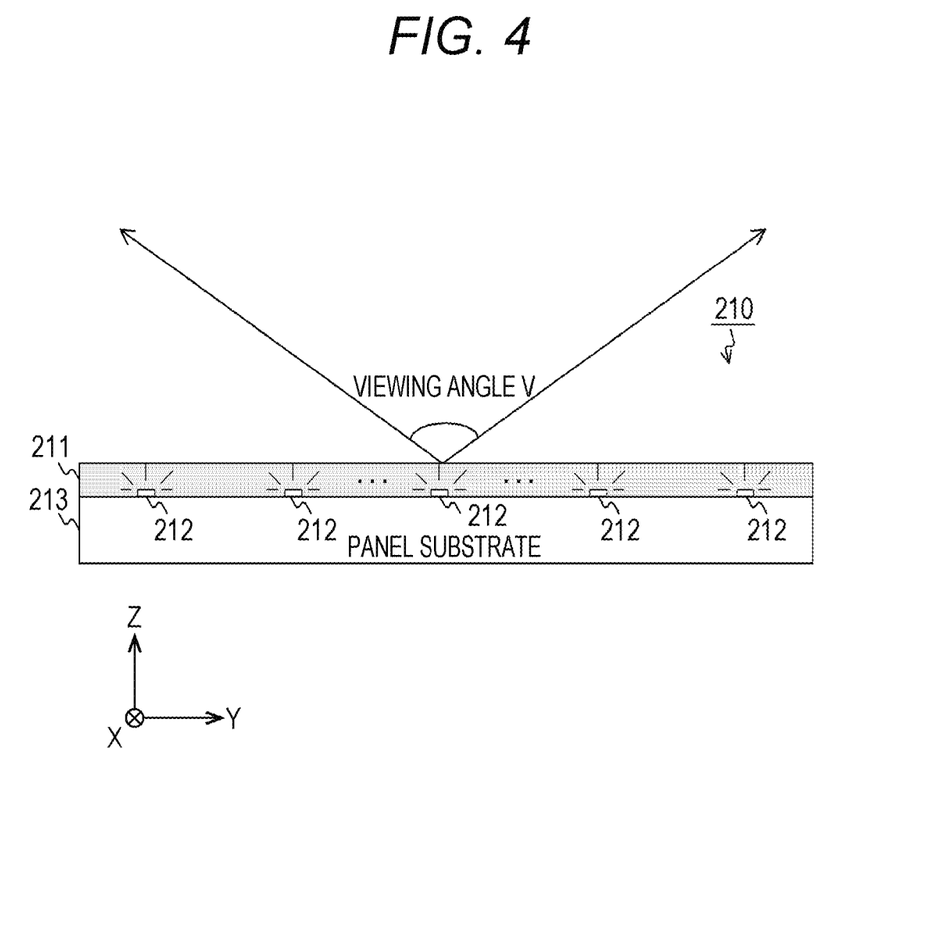
FIG. 4 is an example of a cross-sectional view of a display panel according to the first embodiment.

FIG. 4 is an example of a cross-sectional view of a display panel 210 according to the first embodiment. The display panel 210 includes a protective film 211, multiple light emitting elements 212, and a panel substrate 213.

The panel substrate 213 is a rectangular substrate for placing the light emitting elements 212 thereon. The light emitting elements 212 emit light according to a control signal from the control unit 110. Light-emitting diodes, for example, are used for the light emitting elements 212. Each of the light emitting elements 212 emits light of a specific wavelength of R, G, or B, for example. The light emitting elements 212 are arranged in a two-dimensional grid, for example, on the panel substrate 213.

The protective film 211 is a transparent film that covers the panel substrate 213 to protect circuits and elements on the panel substrate 213 from moisture and dust. The protective film 211 is formed by coating the panel substrate 213 with a transparent plastic. The protective film. 211 is also called a sealing film. The protective film 211 is an example of a film stated in the claims.

In the display device, the angle of a field of view where the brightness satisfies a certain criterion is generally called a viewing angle. The unit of the viewing angle is "degree", for example. A contrast ratio that is a ratio of maximum and minimum values of brightness at each of various angles is measured in advance by a measurement device, and an angle of a field of view where the contrast ratio is a predetermined value (such as 10:1) or higher is obtained as a viewing angle, for example. The viewing angle is classified as a horizontal viewing angle in the horizontal direction or a vertical viewing angle in the vertical direction.

Since the display panels 210 are arranged with predetermined spaces therebetween as described above, light from the light emitting elements 212 is output not only through the surface of the transparent protective film 211 but also through the side faces thereof. The protective film 211 has a thickness of a value designed so that light from the side faces is not observed within the viewing angle.

Although the structure in which the display panels 210 are provided in the display device 100 is employed above, a structure in which multiple panels of the same structure as the display panels 210 may be provided as illumination panels in an illumination device. In this case, all of the light emitting elements 212 emit light of the same wavelength. In addition, a light emitting unit in which the illumination panels are arranged is provided together with the control unit 110 in the illumination device. Furthermore, the control unit 110 generates a control signal for controlling light emitting operation of the light emitting unit, and transmits the control signal together with a power supply signal to the light emitting unit. A timing signal, a gradation signal indicating a gradation, or the like is generated as the control signal, for example.

Figure 5:
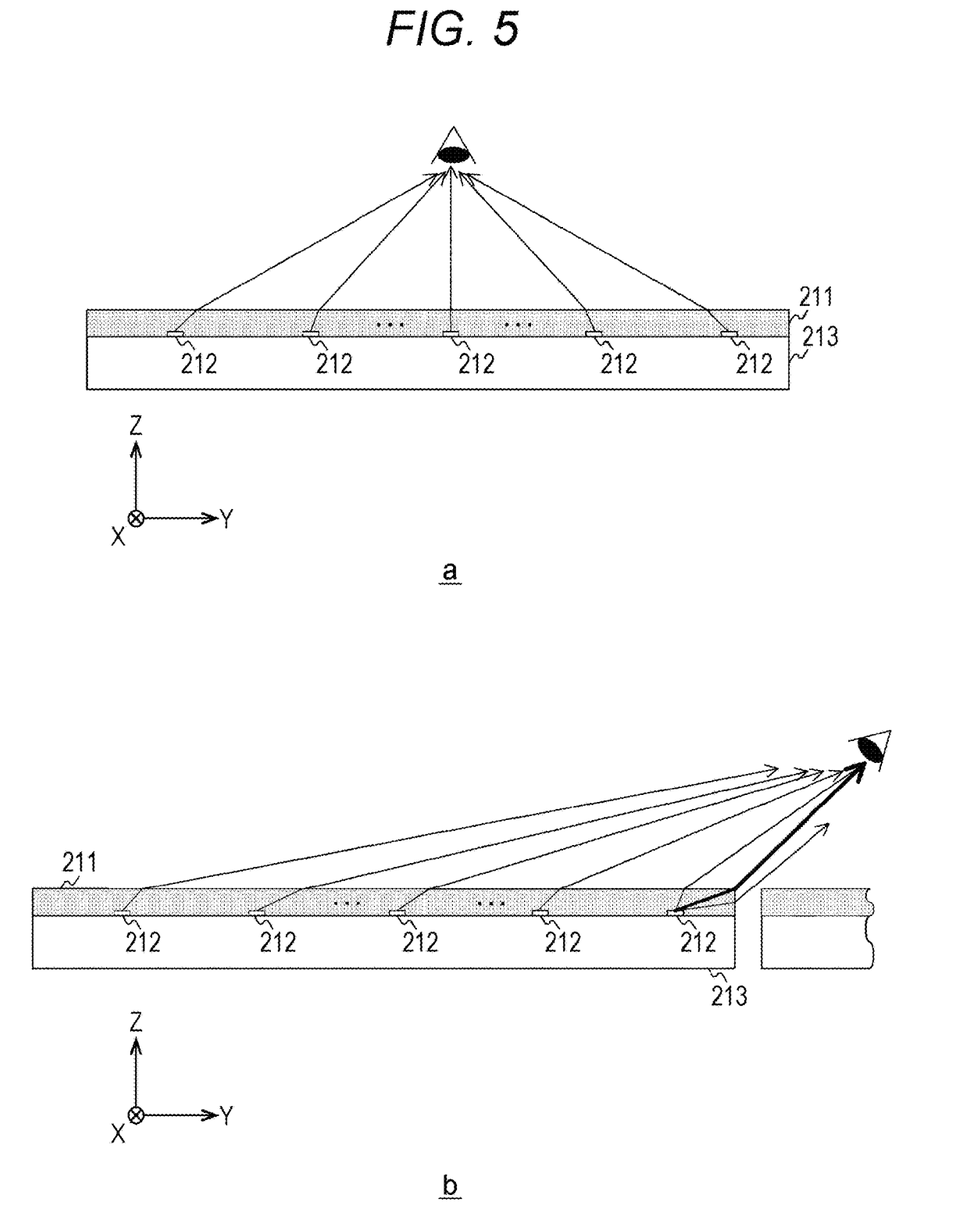
FIGS. 5a and 5b are diagrams explaining light emission through the surface and side faces of a protective film according to the first embodiment.

FIGS. 5a and 5b are diagrams explaining light emission through the surface and side faces of the protective film 211 according to the first embodiment. FIG. 5a is a diagram illustrating an example of light observed by a viewer viewing a display panel 210 from a direction perpendicular to the surface of the display panel 210 (in other words, in front view). As illustrated in FIG. 5a, in the front view, light rays emitted by the respective light emitting elements 212 are refracted only by the surface of the protective film 211 before reaching the viewer's eyes. Since these light rays have substantially uniform light intensities, no brightness unevenness is caused.

In contrast, FIG. 5b is a diagram illustrating an example of light observed by a viewer viewing a display panel 210 from a direction at a certain angle with respect to the surface of the display panel 210. In FIG. 5b, thin solid lines represent light rays refracted by the surface of the protective film 211, and a thick solid line represents a light ray refracted by a side face thereof. As illustrated in FIG. 5b, when the viewer views at a certain angle, light from a light emitting element 212 that is closest to a substrate end is refracted both by the surface and a side face on a predetermined axis parallel to the surface of the panel substrate 213, and these refracted lights both reach the viewer's eyes. Thus, the ends of the display panel 210 appear brighter than the remaining part thereof, which causes brightness unevenness. The thickness of the protective film 211 is set to a value with which such brightness unevenness is not caused within the viewing angle.

Figure 6:
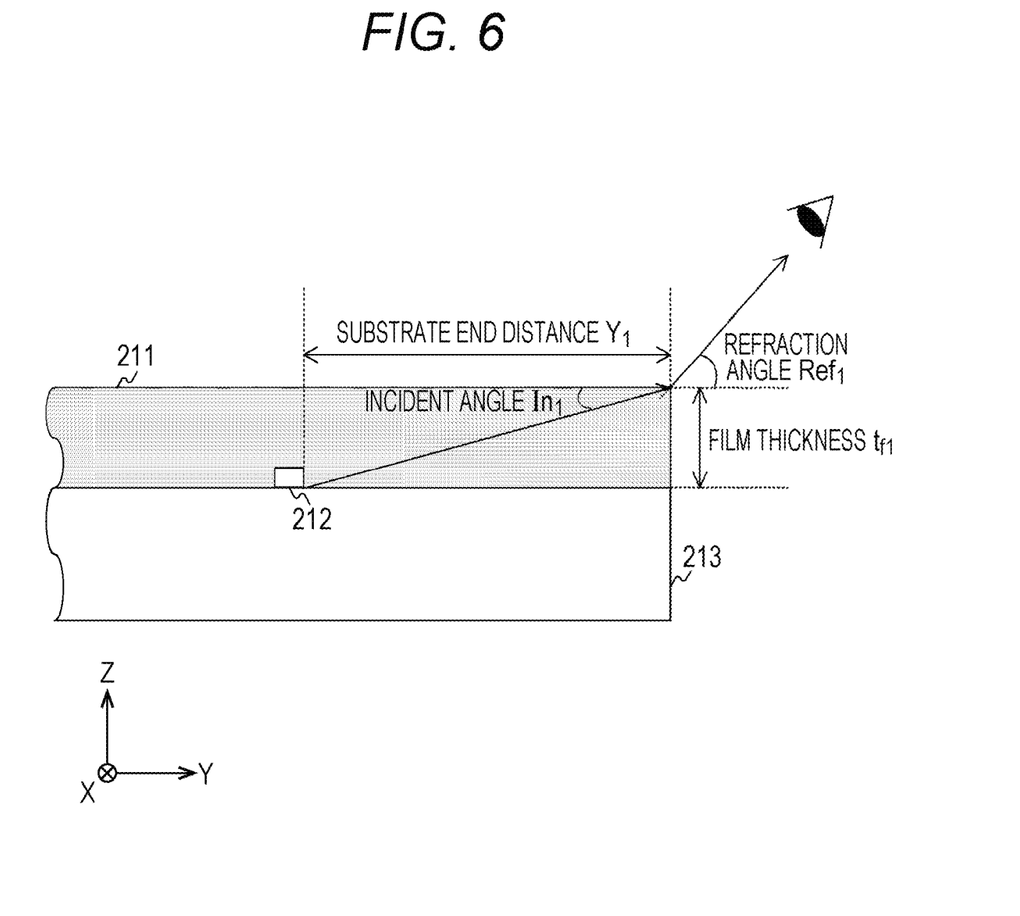
FIG. 6 is an example of an enlarged view of a cross-section of the display panel according to the first embodiment.

FIG. 6 is an example of an enlarged view of a cross-section of the display panel 210 according to the first embodiment. As illustrated in FIG. 6, when a light ray is incident on a side face of the protective film 211 and is refracted thereby, the relation between the incidence angle and the refraction angle is expressed by the following expression according to the Snell's law:

$$n_f \cdot \mathrm{Sin}(In_1) = n_a \cdot \mathrm{Sin}(\mathrm{Ref}_1) \qquad \text{Expression 1}$$

In the above expression, $n_f$ represents the refractive index of the protective film 211, $In_1$ represents the minimum value of the incidence angle of light incident on the side face of the protective film 211. In addition, Sin( ) represents a sine function. Furthermore, $n_a$ represents the refractive index of air, and Ref represents the maximum value of the refraction angle of the light ray refracted by the side face of the protective film 211. The unit of $In_1$ and $\mathrm{Ref}_1$ is "degree", for example.

When $n_a$ is 1, the Expression 1 can be rewritten as the following expression:

$$\mathrm{Ref}_1 = \mathrm{ArcSin}\{n_f \times \mathrm{Sin}(In_1)\} \qquad \text{Expression 2}$$

In the above expression, ArcSin represents an inverse function of the sine function.

Furthermore, the following relational expression is derived using the formula of the trigonometric function:

$$t_{f1}/Y_1 = \mathrm{Tan}(In_1) \qquad \text{Expression 3}$$

In the above expression, $t_{f1}$ represents the film thickness of the protective film 211. In addition, $Y_1$ represents the distance from a representative position of a light emitting element 212 that is closest to the substrate end to the substrate end (hereinafter referred to a "substrate end distance") on a predetermined axis parallel to the surface of the panel substrate 213. For the representative position, any one of the position of an end of the light emitting element 212 closer to the substrate end, the position of an end of the light emitting element 212 farther from the substrate end, and the position of the center of the light emitting element 212 is used, for example. Furthermore, Tan( ) represents a tangent function. The unit of $t_{f1}$ and $Y_1$ is micrometer (μm), for example.

The Expression 3 can be rewritten as the following expression:

$$In_1 = \text{ArcTan}(t_{f1}/Y_1) \quad \text{Expression 4}$$

In the above expression, ArcTan( ) represents an inverse function of the tangent function.

The following relational expression is then derived from the Expressions 2 and 4:

$$\text{Ref}_1 = \text{ArcSin}[n_f \sin\{(\text{ArcTan}(t_{f1}/Y_1)\}] \quad \text{Expression 5}$$

The viewing angle can be expressed by the following expression:

$$V = 180 - 2 \cdot (\text{Ref}_1) \quad \text{Expression 6}$$

In the above expression, V represents the viewing angle, and the unit thereof is "degree", for example. As described above, the viewing angle includes a horizontal viewing angle and a vertical viewing angle, and the horizontal viewing angle is used as the viewing angle V in the above expression, for example. Alternatively, the vertical viewing angle may be used. Still alternatively, the larger of the horizontal viewing angle and the vertical viewing angle may be used.

The following expression is derived from the Expressions 5 and 6:

$$k = V \cdot \pi/180 \quad \text{Expression 7}$$

[Mathematical Formula 1]

$$t_{p1} = \sqrt{\frac{-Y_1^2 \sin\left(\frac{\pi-k}{2}\right)^2}{-n_f + \sin\left(\frac{\pi-k}{2}\right)^2}} = Y_1 \sqrt{\frac{-\sin\left(\frac{\pi-k}{2}\right)^2}{-n_f + \sin\left(\frac{\pi-k}{2}\right)^2}} \quad \text{Expression 8}$$

According to the above expression, the film thickness $t_{f1}$ is determined to be a thinner value as the substrate end distance $Y_1$ is shorter, as the viewing angle V is greater, and as the refractive index $n_f$ is greater. The film thickness $t_{f1}$ can be set to the value indicated by the above expression or smaller, so that light leakage through the side face within the viewing angle can be prevented or reduced. As a result, the brightness unevenness does not occur and the image quality can be improved.

Figure 7:
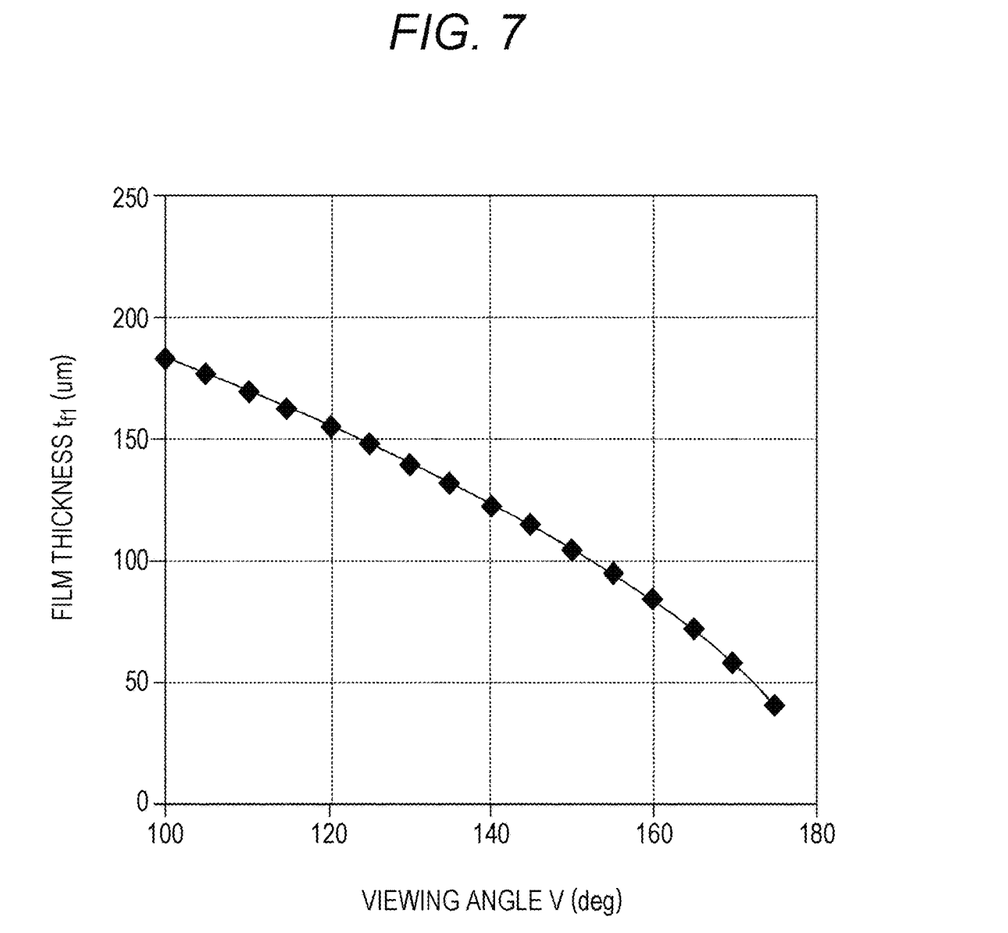
FIG. 7 is a graph illustrating an example of the relation between a film thickness and a viewing angle according to the first embodiment.

FIG. 7 is a graph illustrating an example of the relation between the film thickness and the viewing angle according to the first embodiment. In FIG. 7, the vertical axis represents the film thickness $t_{f1}$ of the protective film 211, and the horizontal axis represents the viewing angle V. FIG. 7 is obtained by plotting the film pressure $t_{f1}$ obtained from the Expressions 7 and 8 for each viewing angle V where the substrate end distance $Y_1$ is 300 (μm) and the refractive index $n_f$ is 1.53. As illustrated in FIG. 7, the film thickness $t_{f1}$ is set to be thinner as the viewing angle V is larger.

As described above, according to the first embodiment of the present technology, since the thickness of the protective film 211 is a value depending on the substrate end distance, the viewing angle, and the refractive index, light leakage through the side face of the protective film 211 within the viewing angle can be prevented or reduced. As a result, the image quality can be improved.

2. Second Embodiment

While nothing is provided at the side faces of the protective film 211 in the first embodiment, a light blocking coating can be applied around the side faces to form a light blocking part, which can more reliably prevent light emission through the side faces. A display device 100 according to a second embodiment is different from that in the first embodiment in that a light blocking part is provided.

Figure 8:
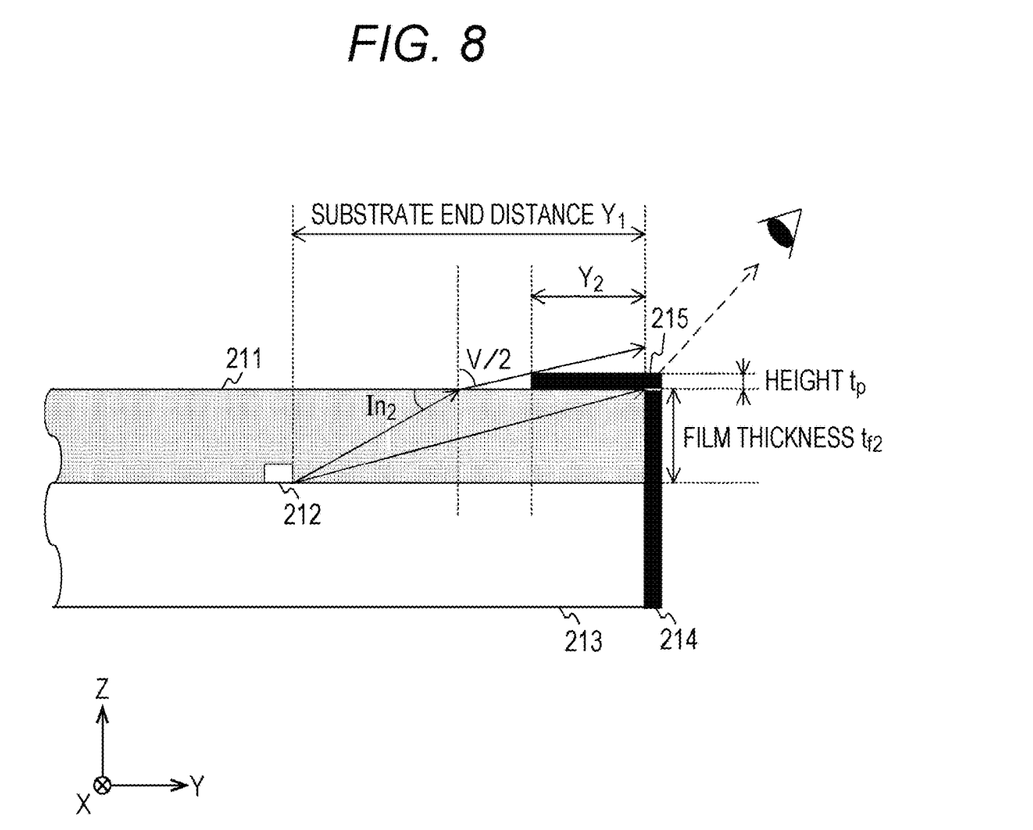
FIG. 8 is an example of an enlarged view of a cross-section of a display panel according to a second embodiment.

FIG. 8 is an example of an enlarged view of a cross-section of a display panel 210 according to the second embodiment. A display unit 200 is different from that in the first embodiment in that a side face light blocking part 214 and a surface light blocking part 215 are further included. Note that, for a display panel 210 having at least one side in contact with the perimeter of a base substrate 220, the light blocking part 214 and the surface light blocking part 215 are not provided on the side in contact with the perimeter. This is because a bezel is provided around the perimeter of the base substrate 220, and light is blocked by the bezel at the side faces of the protective film 211.

The side face light blocking part 214 blocks light at a side face of the protective film 211. The surface light blocking part 215 blocks light at the surface of the protective film 211 in a range from a specific position, which is between a light emitting element 212 that is closest to a substrate end and the substrate end of the panel substrate 213, to the substrate end. The distance from the specific position to the substrate end will be hereinafter referred to as a "wraparound amount".

The side face light blocking part 214 is formed by a method in which a coating applicator applies a light blocking coating for blocking visible light to a side face with a roller or the like, for example. Alternatively, the side face light blocking part 214 is formed by an inkjet method in which a light blocking coating is turned into microdroplets and sprayed directly onto the surface.

Although the coating application methods for the side face light blocking part 214 and the surface light blocking part 215 are different from each other, the side face light blocking part 214 and the surface light blocking part 215 may alternatively be coated by the same method. The types of the light blocking coatings for forming the side face light blocking part 214 and the surface light blocking part 215 are selected as appropriate according to the coating application methods.

In addition, although the side face light blocking part 214 and the surface light blocking part 215 are formed by the light blocking coatings, the structure is not limited thereto. At least one of the side face light blocking part 214 and the surface light blocking part 215 may be formed by bonding a plate member that blocks visible light with an adhesive, for example.

As a result of providing the side face light blocking part 214 and the surface light blocking part 215 described above, light through the side faces of the protective film 211 is blocked reliably. Consequently, when light is incident only on the surface of the protective film 211 and is refracted thereby, the relation between the incidence angle and the refraction angle is expressed by the following expression according to the Snell's law:

$$n_f \text{Sin}(In_2) = n_a \cdot \text{Sin}(k/2) \quad \text{Expression 9}$$

In the above expression, $In_2$ represents an incidence angle when the refraction angle at the surface of the protective film 211 is k/2. In other words, $In_2$ represents an incidence angle when an angle between refracted light resulting from refraction by the surface and an axis perpendicular to the surface is half the viewing angle.

The Expression 9 can be rewritten as the following expression:

$$In_2 = \text{ArcSin}\{\text{Sin}(k/2)/n_f\} \quad \text{Expression 10}$$

Furthermore, the following expression is derived using the formula of the trigonometric function:

$$Y_2 = Y_1 - t_{f2} \cdot \text{Tan}(In_2) - t_p \cdot \text{Tan}(k/2) \quad \text{Expression 11}$$

In the above expression, $t_p$ represents the height of the surface light blocking part 215 with respect to the surface of the protective film 211 (in other words, the thickness of the light blocking coating). In addition, $Y_2$ represents the wraparound amount. The unit of the height $t_p$ and the wraparound amount $Y_2$ is micrometer (μm), for example. Note that the height $t_p$ may be approximated to "0" (μm) for calculation.

The following expression is derived from the Expressions 10 and 11:

[Mathematical Formula 2]

$$t_{f2} = \frac{\sqrt{n_f^2 - \text{Sin}(k/2)}}{\text{Sin}(k/2)}\{Y_1 - Y_2 - t_p\text{Tan}(k/2)\} \quad \text{Expression 12}$$

According to the above expression, the film thickness $t_{f1}$ is determined to be a thinner value as the substrate end distance $Y_1$ is shorter, as the viewing angle V is greater, as the refractive index $n_f$ is greater, or as the wraparound amount $Y_2$ is greater. The film thickness can be set to the value indicated by the above expression or smaller, so that occurrence of a phenomenon of part of an image missing due to the surface light blocking part 215 (that is, vignetting) can be prevented or reduced. As a result, the image quality can be improved.

As described above, according to the second embodiment of the present technology, since the surface light blocking part and the side face light blocking part are provided to make the film thickness thinner as the wraparound amount of the protective film is greater, light emission through the side faces and vignetting can be prevented or reduced, and the image quality can be improved.

Modified Example

Although the thickness of the protective film 211 is determined on the basis of the wraparound amount of the surface light blocking part 215 in the second embodiment, the wraparound amount can alternatively be determined on the basis of the thickness of the protective film 211. A display device 100 according to a modified example of the second embodiment is different from that in the second embodiment in that the wraparound amount is determined on the basis of the thickness of the protective film 211.

In the modified example, the wraparound amount $Y_2$ is set to a value satisfying the following expression on the basis of the relation of the Expression 12.

[Mathematical Formula 3]

$$M \le Y_2 \le Y_1 - \frac{t_{f2}\text{Sin}(k/2)}{\sqrt{n_f^2 - \text{Sin}(k/2)^2}} - t_p\text{Tan}(k/2) \quad \text{Expression 13}$$

In the above expression, M represents a margin. The unit of the margin M is micrometer (μm), for example. For example, 10 (μm) is set as the margin M.

Although the wraparound amount $Y_2$ is obtained from the Expression 13, any of the substrate end distance $Y_1$, the viewing angle V, and the refractive index $n_f$ may alternatively be obtained on the basis of the wraparound amount $Y_2$, the film thickness $t_f$, and the Expression 12.

Figure 9:
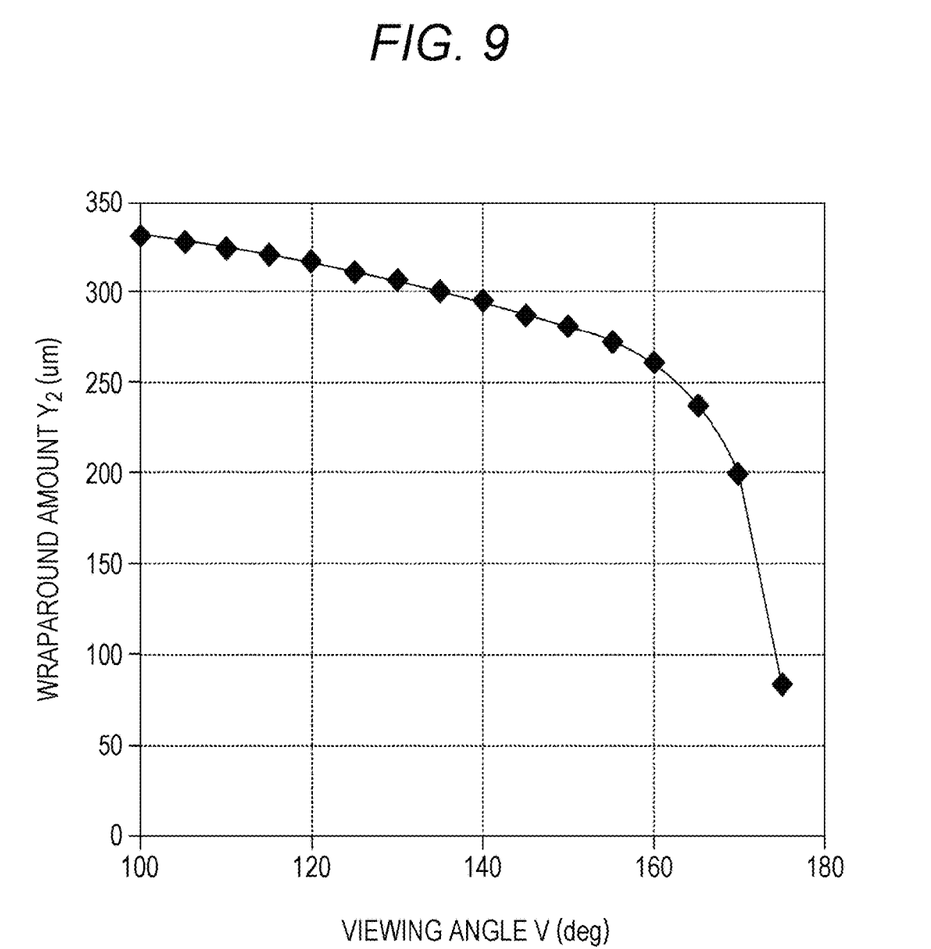
FIG. 9 is a graph illustrating an example of the relation between a wraparound amount and a viewing angle according to a modified example of the second embodiment.

FIG. 9 is a graph illustrating an example of the relation between the wraparound amount and the viewing angle according to the modified example of the second embodiment. In FIG. 9, the vertical axis represents the wraparound amount $Y_2$ of the protective film 211, and the horizontal axis represents the viewing angle V. FIG. 9 is obtained by plotting the maximum value of the wraparound amount $Y_2$ obtained from the Expression 13 for each viewing angle V where the substrate end distance $Y_1$ is 400 (μm), the film thickness $t_f$ of the protective film 211 is 100 (μm), the refractive index $n_f$ is 1.53, and the height $t_p$ of the surface light blocking part 215 is 10 (μm). As illustrated in FIG. 9, the wraparound amount $Y_2$ is set to be smaller as the viewing angle V is larger.

As described above, according to the modified example of the second embodiment, since the wraparound amount is determined on the basis of the thickness of the protective film 211, light emission through the side faces and vignetting can be prevented or reduced, and the image quality can be improved.

3. Third Embodiment

The light blocking parts are provided on the surface and the side faces of the protective film 211 in the first embodiment; the light blocking parts, however, may come off owing to degradation over time or a shock. In order to prevent the light blocking parts from coming off, edges of the protective film 211 are preferably rounded so that the bonding areas of the light blocking parts are increased. A display device 100 according to a third embodiment is different from that in the first embodiment in that edges of the protective film 211 are rounded before providing the light blocking parts.

Figure 10:
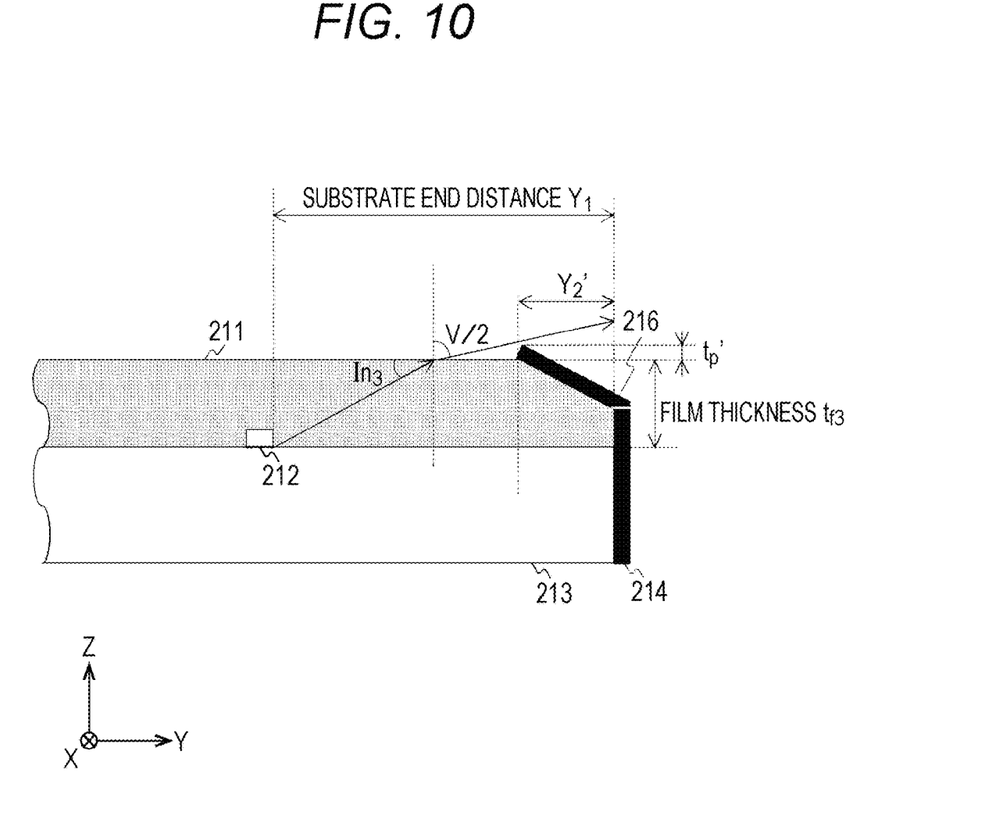
FIG. 10 is an example of an enlarged view of a cross-section of a display panel according to a third embodiment.

FIG. 10 is an example of an enlarged view of a cross-section of a display panel 210 according to the third embodiment. A rounded surface is formed by edge rounding on the protective film 211 in a range from a specific position, which is between a light emitting element 211 that is closest to a substrate end and the substrate end, to the substrate end. The distance from the specific position to the substrate end will be hereinafter referred to as a "rounding distance". A rounded surface light blocking part 216 that blocks light at the rounded surface and the side face light blocking part 214 are provided on the display panel 210. The rounded surface light blocking part 216 is formed by a coating applicator applying a light blocking coating with a roller, for example. Alternatively, the rounded surface light blocking part 216 may be formed by an inkjet method, or a method of bonding a plate member that blocks visible light with an adhesive.

When the height of the rounded surface light blocking part 216 with respect to the surface of the protective film 211 is represented by $t_p'$ and the rounding distance is represented by $Y_3$, the film thickness $t_{f3}$ expressed by the following expression is obtained by replacing the height $t_p$ and the wraparound amount $Y_2$ in the right-hand side of the Expression 12 by $t_p'$ and $Y_3$:

[Mathematical Formula 4]

$$t_{f3} = \frac{\sqrt{n_f^2 - \mathrm{Sin}(V/2)}}{\mathrm{Sin}(V/2)}\{Y_1 - Y_3 - t'_p \mathrm{Tan}(k/2)\} \quad \text{Expression 15}$$

According to the above expression, the film thickness $t_{f3}$ is determined to be a thinner value as the substrate end distance $Y_1$ is shorter, as the viewing angle V is greater, as the refractive index $n_f$ is greater, or as the rounding distance $Y_3$ is greater. The film thickness $t_{f3}$ can be set to the value indicated by the above expression or smaller, so that occurrence of vignetting can be prevented or reduced. Furthermore, the light blocking parts can be prevented from coming off. Note that the height $t_p'$ can be approximated to "0" (μm) for calculation.

As described above, according to the third embodiment of the present technology, since the surface light blocking part and the rounded surface light blocking part are provided to make the film thickness thinner as the rounding distance is greater, the light blocking parts can be prevented from coming off and the image quality can be improved.

Modified Example

Although the thickness of the protective film 211 is determined on the basis of the rounding distance of the rounded surface light blocking part 216 in the third embodiment, the rounding distance can alternatively be determined on the basis of the thickness of the protective film 211. A display device 100 according to a modified example of the second embodiment is different from that in the second embodiment in that the rounding distance is determined on the basis of the thickness of the protective film 211.

In the modified example, the rounding distance $Y_3$ is set to a value satisfying the following expression on the basis of the relation of the Expression 15:

[Mathematical Formula 5]

$$M \le Y_3 \le Y_1 - \frac{t_{f3}\mathrm{Sin}(V/2)}{\sqrt{n_f^2 - \mathrm{Sin}(V/2)^2}} - t'_p \cdot \mathrm{Tan}(k/2) \quad \text{Expression 14}$$

Although the rounding distance $Y_3$ is obtained from the Expression 14, any of the substrate end distance $Y_1$, the viewing angle V, and the refractive index $n_f$ may alternatively be obtained on the basis of the rounding distance $Y_3$, the film thickness $t_{f3}$ and the Expression 13.

As described above, according to the modified example of the third embodiment, since the rounding distance is determined on the basis of the thickness of the protective film 211, the light blocking parts are prevented from coming off, and the image quality can be improved.

Note that the embodiments described above merely present illustrative examples for embodying the present technology, and matters in the embodiments and matters specifying the invention in the claims are associated with each other. Similarly, matters specifying the invention in the claims and the matters referred to by the same names as the matters specifying the invention are associated with each other. The present technology, however, is not limited to the embodiments, but can be embodied with various modifications made thereto without departing from the scope of the technology.

Note that the present technology can also have the following features.

(1) A display panel including:

a panel substrate provided with multiple light emitting elements configured to emit light; and a film made of a material having a predetermined refractive index, and a thickness depending on a viewing angle and the refractive index, the viewing angle being an angle of a field of view where a substrate end distance from a light emitting element that is closest to an end of the panel substrate among the light emitting elements to the end and brightness of the light satisfy predetermined criteria.

(2) The display panel according to (1), wherein the thickness is set to a constant value that is thinner as the substrate end distance shorter.

(3) The display panel according to (1) or (2), wherein the thickness is set to a constant value that is thinner as the refractive index is greater.

(4) The display panel according to any one of (1) to (3), wherein the thickness is set to a constant value that is thinner as the viewing angle is greater.

(5) The display panel according to any one of (1) to (4), wherein the thickness is a value determined by the following expression: $t_{f1} \le Y_1 \cdot [-\mathrm{Sin}\ \{(\pi-k)/2\}]^{1/2}/[-\mathrm{nf}+\mathrm{Sin}\ \{(\pi-k)/2\}]^{1/2}$ where the thickness is represented by $t_{f1}$, the substrate end distance is represented by $Y_1$, the refractive index is represented by $N_f$, the viewing angle is represented by V, and a coefficient expressed by $V \cdot \pi/180$ is represented by k.

(6) The display panel according to any one of (1) to (5), further including:

a side face light blocking part that blocks light at a side face of the film; and a surface light blocking part that blocks light at a surface of the film in a range from a specific position, which is between the light emitting element and the end, to the end.

(7) The display panel according to (6), wherein the thickness is set to a constant value that is thinner as a wraparound amount that is a distance from the specific position to the end is greater.

(8) The display panel according to (7), wherein the thickness is a value determined by the following expression: $t_{f2} \le (Y_1 - Y_2) \cdot \{\mathrm{nf} - \mathrm{Sin}(k/2)\}^{1/2}/\mathrm{Sin}(k/2)$ where the thickness is represented by $t_{f2}$, the substrate end distance is represented by $Y_1$, the refractive index is represented by $N_f$, the viewing angle is represented by V, a coefficient expressed by $V \cdot \pi/180$ is represented by k, and the wraparound amount is represented by $Y_2$.

(9) The display panel according to (7), wherein the thickness is a value determined by the following expression: $t_{f2} \le \{Y_1 - Y_2 + t_p\ \mathrm{Tan}(k/2)\} \cdot \{n_f - \mathrm{Sin}(k/2)\}^{1/2}/\mathrm{Sin}(k/2)$ where the thickness is represented by $t_{f2}$, the substrate end distance is represented by $Y_1$, the refractive index is represented by $N_f$, the viewing angle is represented by V, a coefficient expressed by $V \cdot \pi/180$ is represented by k, the wraparound amount is represented by $Y_2$, and a height of the surface light blocking part is represented by $t_p$.

(10) The display panel according to any one of (1) to (9), further including:

a side face light blocking part that blocks light at a side face of the film; and a rounded surface light blocking part that blocks light at a rounded surface formed on the film by edge rounding in a range from a specific position, which is between the light emitting element and the end, to the end.

(11) The display panel according to (10), wherein the thickness is set to a constant value that is thinner as a rounding distance that is a distance from the specific position to the end is greater.

(12) The display panel according to (11), wherein the thickness is a value determined by the following expression: $t_{f3} \leq (Y_1-Y_2') \cdot \{n_f-\text{Sin}(k/2)\}^{1/2}/\text{Sin}(k/2)$ where the thickness is represented by $t_{f3}$, the substrate end distance is represented by $Y_1$, the refractive index is represented by $N_f$, the viewing angle is represented by V, a coefficient expressed by $V \cdot \pi/180$ is represented by k, and the rounding distance is represented by $Y_2'$.

(13) The display panel according (11), wherein the thickness is a value determined by the following expression: $t_{f3} \leq \{Y_1-Y_2'+t_p' \; \text{Tan}(k/2)\} \cdot \{n_f-\text{Sin}(k/2)\}^{1/2}/\text{Sin}(k/2)$ where the thickness is represented by $t_{f3}$, the substrate end distance is represented by $Y_1$, the refractive index is represented by $N_f$, the viewing angle is represented by V, a coefficient expressed by $V \cdot \pi/180$ is represented by k, the rounding distance is represented by $Y_2'$, and a height of one end of the rounded surface light blocking part with respect to a surface of the film is represented by $t_p'$.

(14) A display device including:
multiple display panels, each of the display panels including a panel substrate provided with multiple light emitting elements configured to emit light, and a film made of a material having a predetermined refractive index, and a thickness depending on a viewing angle and the refractive index, the viewing angle being an angle of a field of view where a substrate end distance from a light emitting element that is closest to an end of the panel substrate among the light emitting elements to the end and brightness of the light satisfy predetermined criteria; and
a control unit configured to control the display panels.

(15) An illumination device including:
multiple illumination panels, each of the illumination panels including a panel substrate provided with multiple light emitting elements configured to emit light, and a film made of a material having a predetermined refractive index, and a thickness depending on a viewing angle and the refractive index, the viewing angle being an angle of a field of view where a substrate end distance from a light emitting element that is closest to an end of the panel substrate among the light emitting elements to the end and brightness of the light satisfy predetermined criteria; and
a control unit configured to control the illumination panels.

REFERENCE SIGNS LIST

100 Display device
110 Control unit
200 Display unit
210 Display panel
211 Protective film
212 Light emitting element
13 Panel substrate
214 Side face light blocking part
215 Surface light blocking part
216 Rounded surface light blocking part
220 Base substrate

The invention claimed is:

1. A display panel comprising:
a panel substrate provided with multiple light emitting elements configured to emit light; and
a film made of a material having a predetermined refractive index, and a thickness depending on a viewing angle and the refractive index, the viewing angle being an angle of a field of view where a substrate end distance from a light emitting element that is closest to an end of the panel substrate among the light emitting elements to the end and brightness of the light satisfy predetermined criteria,
wherein the thickness is set to a constant value that is thinner as the substrate end distance is shorter.

2. The display panel according to claim 1, wherein the thickness is set to a constant value that is thinner as the refractive index is greater.

3. The display panel according to claim 1, wherein the thickness is set to a constant value that is thinner as the viewing angle is greater.

4. The display panel according to claim 1, wherein the thickness is a value determined by the following expression: $t_{f1} \leq Y_1 \cdot [-\text{Sin}\{(\pi-k)/2\}]^{1/2}/[-nf+\text{Sin}\{(\pi-k)/2\}]^{1/2}$ where the thickness is represented by $t_{f1}$, the substrate end distance is represented by $Y_1$, the refractive index is represented by $N_f$, the viewing angle is represented by V, and a coefficient expressed by $V \cdot \pi/180$ is represented by k.

5. The display panel according to claim 1, further comprising:
a side face light blocking part that blocks light at a side face of the film; and
a surface light blocking part that blocks light at a surface of the film in a range from a specific position, which is between the light emitting element and the end, to the end.

6. The display panel according to claim 5, wherein the thickness is set to a constant value that is thinner as a wraparound amount that is a distance from the specific position to the end is greater.

7. The display panel according to claim 6, wherein the thickness is a value determined by the following expression: $t_{f2} \leq (Y_1-Y_2) \cdot \{nf-\text{Sin}(k/2)\}^{1/2}/\text{Sin}(k/2)$ where the thickness is represented by $t_{f2}$, the substrate end distance is represented by $Y_1$, the refractive index is represented by $N_f$, the viewing angle is represented by V, a coefficient expressed by $V \cdot \pi/180$ is represented by k, and the wraparound amount is represented by $Y_2$.

8. The display panel according to claim 6, wherein the thickness is a value determined by the following expression: $t_{f2} \leq \{Y_1-Y_2+t_p \; \text{Tan}(k/2)\} \cdot \{n_f-\text{Sin}(k/2)\}^{1/2}/\text{Sin}(k/2)$ where the thickness is represented by $t_{f2}$, the substrate end distance is represented by $Y_1$, the refractive index is represented by $N_f$, the viewing angle is represented by V, a coefficient expressed by $V \cdot \pi/180$ is represented by k, the wraparound amount is represented by $Y_2$, and a height of the surface light blocking part is represented by $t_p$.

9. The display panel according to claim 1, further comprising:
a side face light blocking part that blocks light at a side face of the film; and
a rounded surface light blocking part that blocks light at a rounded surface formed on the film by edge rounding in a range from a specific position, which is between the light emitting element and the end, to the end.

10. The display panel according to claim 9, wherein the thickness is set to a constant value that is thinner as a rounding distance that is a distance from the specific position to the end is greater.

11. The display panel according to claim 10, wherein the thickness is a value determined by the following expression: $t_{f3} \leq (Y_1-Y_2') \cdot \{n_f-\text{Sin}(k/2)\}^{1/2}/\text{Sin}(k/2)$ where the thickness is represented by $t_{f3}$, the substrate end distance is represented by $Y_1$, the refractive index is represented by $N_f$, the viewing angle is represented by V, a coefficient expressed by V·π/180 is represented by k, and the rounding distance is represented by $Y_2'$.

12. The display panel according to claim 10, wherein the thickness is a value determined by the following expression: $t_f \le \{Y_1-Y_2'+t_p'\ \text{Tan}(k/2)\} \cdot \{n_f-\text{Sin}(k/2)\}^{1/2}/\text{Sin}(k/2)$ where the thickness is represented by $t_f$, the substrate end distance is represented by $Y_1$, the refractive index is represented by $N_f$, the viewing angle is represented by V, a coefficient expressed by V·π/180 is represented by k, the rounding distance is represented by $Y_2'$, and a height of one end of the rounded surface light blocking part with respect to a surface of the film is represented by $t_p'$.

13. A display device comprising:

multiple display panels, each of the display panels including a panel substrate provided with multiple light emitting elements configured to emit light, and a film made of a material having a predetermined refractive index, and a thickness depending on a viewing angle and the refractive index, the viewing angle being an angle of a field of view where a substrate end distance from a light emitting element that is closest to an end of the panel substrate among the light emitting elements to the end and brightness of the light satisfy predetermined criteria; and a control unit configured to control the display panels, wherein the thickness is set to a constant value that is thinner as the substrate end distance is shorter.

14. An illumination device comprising:

multiple illumination panels, each of the illumination panels including a panel substrate provided with multiple light emitting elements configured to emit light, and a film made of a material having a predetermined refractive index, and a thickness depending on a viewing angle and the refractive index, the viewing angle being an angle of a field of view where a substrate end distance from a light emitting element that is closest to an end of the panel substrate among the light emitting elements to the end and brightness of the light satisfy predetermined criteria; and a control unit configured to control the illumination panels, wherein the thickness is set to a constant value that is thinner as the substrate end distance is shorter.

* * * * *